No. 783,662.  
PATENTED FEB. 28, 1905.

L. WOLFF.  
INCANDESCENT GAS LIGHT LAMP.  
APPLICATION FILED JULY 14, 1904.

2 SHEETS—SHEET 1.

Witnesses:  
N. Reynolds  
G. V. Forbes

Inventor.  
Louis Wolff.  
By D. T. Hothaupter  
Attorney.

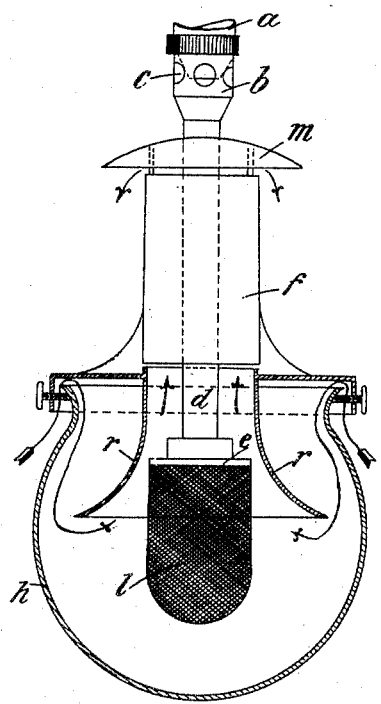

No. 783,662. Patented February 28, 1905.

UNITED STATES PATENT OFFICE.

LOUIS WOLFF, OF BERLIN, GERMANY.

INCANDESCENT GAS-LIGHT LAMP.

SPECIFICATION forming part of Letters Patent No. 783,662, dated February 28, 1905.

Application filed July 14, 1904. Serial No. 216,539.

*To all whom it may concern:*

Be it known that I, LOUIS WOLFF, a subject of the King of Prussia, German Emperor, and a resident of Berlin, in the Kingdom of Prussia, German Empire, have invented certain new and useful Improvements in Incandescent Gas-Light Lamps, of which the following is a full, clear, and exact description.

This invention relates to incandescent gas-light lamps having a suction-pipe, in which lamps the gas-outlet aperture of the burner-head is not directed upward, but either downward or obliquely downward or horizontally or the like.

The object of the invention is to afford a uniform steady combustion not only for lamps for indoor use, but also for outdoor lamps. The improved arrangement consists in the air necessary for forming the flame being only indirectly conveyed to the place where the flame is found and exclusively by the suction action of a suction-pipe connected with the cylinder surrounding the incandescent body or mantle and a glass bell or globe inclosing the cylinder.

The arrangement of lamp for carrying out this invention is shown in the accompanying drawings.

Figure 1:
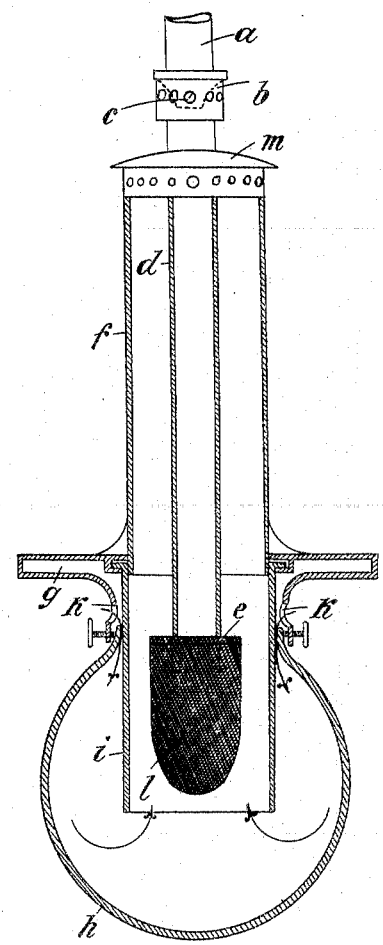
Figure 2:
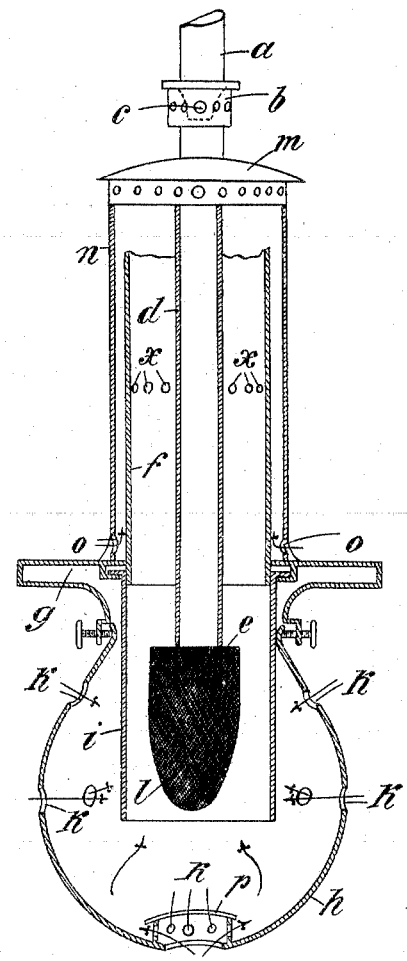

Figure 1 is a vertical section of one form of construction; Fig. 2, a vertical section of a modified form, and Fig. 3 a vertical section of a further modified form.

Now referring to Fig. 1, $a$ is the gas-supply pipe; $b$, the nozzle; $c$, the air-inlet aperture for the nozzle; $d$, the mixing-pipe, in which the gas is mixed with the air in the ordinary manner and discharged at $e$ from the burner-head. $f$ is the suction or draft pipe; $g$, the reflector, on which the glass globe or bell $h$ is preferably mounted; $i$, a combustion-cylinder surrounding the incandescent body or mantle; $k$, air-inlet apertures through which the air, which flows over the incandescent body $l$, enters and is drawn off through the suction-pipe $f$. The gases of combustion pass out at $m$. The suction-pipe $f$ may be made longer or shorter, according as its suction capacity is to be increased or diminished. Air-holes $x$ may also be provided in the draft-pipe $f$ for limiting or restricting its suction action, and the draft-pipe may also consist of several pipes.

Fig. 2 shows in addition to the actual draft-pipe $f$ also a casing $n$, surrounding the said suction-pipe and having at $o$ air-inlet apertures serving for cooling the suction-pipe $f$. As Fig. 2 also shows, the air-inlet apertures $k$ may also be placed otherwise. For instance, they may be arranged at the sides of the glass globe or bell itself or beneath the cylinder in the glass bell. In the latter case, however, the aperture must be provided with a protective hood or cover $p$, as the requirements must always be fulfilled that the air for combustion drawn in from the outside on entering the bell or globe shall never directly encounter the incandescent body. Both the cylinder $i$ and also the glass globe $h$ may be formed differently to those shown in the drawings.

In the modification shown in Fig. 3 the incandescent body $l$ is surrounded by a funnel-shaped mantle $r$, apertured upward and open above and serving as a reflector, for which purpose the same is suitably treated on its inner face, as well as a means for guiding the necessary air for combustion to the incandescent body $l$ in such a manner that the latter will become incandescent on its whole length and guiding air and gaseous products to above in due manner. Thus the special reflector $g$ and the cylinder $i$ as used in the arrangement shown in Figs. 1 and 2 are dispensed with, as both parts may be substituted by the sole funnel-shaped body $r$. This funnel-shaped body $r$ in part subserves the same function as the combustion cylinder or tube $i$ described in connection with the other forms of the invention.

The metallic parts of the lamp may be connected or secured together by any of the expedients which are well known to sheet-metal workers, and hence it will be understood that parts $g$ and $f$ and also the parts $f$, $m$, and $d$ may be united through the medium of brazing or equivalent means.

The term "combustion-cylinder" as applied to the element *i* of Figs. 1 and 2 and *r* of Fig. 3 of the drawings is not intended to be restricted to a body which is cylindrical throughout, but refers generically to a tube of any proper form that can be arranged about the burner to perform the functions of the said elements *i* and *r*.

Having now described my invention, what I claim as new, and desire to secure by Letters Patent, is—

1. In an incandescent gas-lamp, the combination of a gas-supply pipe, a burner carried upon the lower end of said pipe and in communication therewith, a suitable support, a combustion-cylinder pendent from said support and arranged about the burner, an incasing globe also suspended from said support and in open communication with the combustion-cylinder, means for admitting air into the globe, and a suction-pipe extended from the top of the support in substantial alinement with the combustion-cylinder and having a vented upper end portion connected with the gas-supply pipe a distance above said support.

2. In an incandescent gas-lamp, the combination with the incandescent burner, of a gas-supply pipe in communication with the burner, a suitable support, a combustion-cylinder carried by said support and arranged about the burner, an incasing globe suspended from said support and in open communication with the combustion-cylinder, means for admitting air into the globe, a suction-pipe extended from the combustion-cylinder and provided with draft-regulating air-escape apertures, and a cooling-jacket arranged about the suction or draft pipe.

In witness whereof I have hereunto set my hand in presence of two witnesses.

LOUIS WOLFF.

Witnesses:
WOLDEMAR HAUPT,
HENRY HASPER.